United States Patent Office 2,901,492
Patented Aug. 25, 1959

2,901,492

16,20-DIKETO STEROIDS AND PROCESS FOR PREPARING SAME

Josef E. Herz and Josef Fried, New Brunswick, N.J., assignors to Olin Mathieson Chemical Corporation, New York, N.Y., a corporation of Virginia.

No Drawing. Application August 31, 1954
Serial No. 453,433

15 Claims. (Cl. 260—397.1)

This invention relates to a new class of steroids and a process for preparing the same, and more particularly is concerned with new 16,20-diketo-steroids and their method of manufacture.

Prior to this invention, 16,20-diketo-steroids were unknown, since there was no operative process for preparing them. Any attempt to oxidize a 16-hydroxy-20-keto steroid under the usual oxidizing conditions with ordinary oxidizing agents either cleaved the D-ring or oxidized the 17-side chain to an acid group. We have now found that by practicing this invention, a 16-hydroxy-20-keto steroid may be oxidized to the corresponding 16,20-diketo steroid.

An object of this invention, therefore, is to produce new steroid derivatives having oxo groups (or groups readily convertible thereto, such as acetal radicals) in the 16- and 20-positions.

Another object of this invention is the provision of an advantageous process for oxidizing 16-hydroxy steroids.

These objects are achieved by reacting a 16-hydroxy steroid with an oxidizing agent containing a hexavalent chromium (chromic) ion in the absence of excess acid (by excess acid is meant acid other than that required to bind the resulting reduced chromic ion as a salt).

Although the process of this invention is operative to oxidize any 16-hydroxy-steroid to the corresponding 16-keto steroid, and hence includes oxidizing those steroids of the androstane (including the androstene and etiocholane) series, as well as those steroids of the pregnane (including the pregnene, pregnadiene, pregnatriene, etc., and allopregnane) series, the process is especially advantageous when applied to a pregnane derivative having a 16-hydroxy and 20-keto substituent, since the oxidation conditions previously known would cleave such a pregnane derivative or cause the oxidation or loss of the 17-carbon chain.

The new steroids produced by the practice of this invention are 16,20-diketo-pregnane derivatives having the skeleton structure:

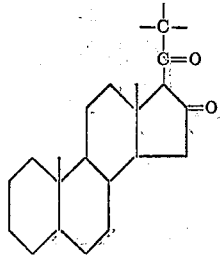

These steroids are mineralocorticoids which cause the retention of sodium and chloride ions in animals and man.

The starting materials useful in this process are any 16-hydroxy steroids. The preferred compounds, however, are 16-hydroxy-20-keto-pregnane derivatives, wherein the 16-hydroxy radical may be in either the alpha or beta position. [16α-hydroxy-steroids utilizable as starting materials are exemplified by those disclosed in the applications of Perlman, et al., Serial No. 239,018, filed July 27, 1951, now Patent No. 2,709,705, granted May 31, 1955, and Fried et al., Serial No. 453,411, filed on even date herewith, and now abandoned.] These pregnane derivatives, in addition to the 16-hydroxy and 20-keto substituents, may carry any other radicals (not altered by chromic acid) on the carbon nucleus or 17-side chain and may be saturated or partially saturated. Examples of suitable substituents are hydrocarbon groups; acid, ester, or amide radicals; ether, tertiary hydroxy or acylated secondary or primary hydroxy radicals; nitrogen containing radicals such as nitro or acylated amino groups; and halogens.

Examples of suitable starting materials are the 16α-hydroxy derivatives of: progesterone; hydroxylated progesterone; halogenated progesterone; pregnenolone; pregnanolone; desoxycorticosterone 21-monoacylate; cortisone; 17-hydroxycorticosterone; dehydrocorticosterone; 17α-hydroxy-11-desoxycorticosterone; diketo-Δ⁴-androstene; testosterone; corticosterone; aldosterone; etc. as well as their esters (when a second hydroxy group is present) such as a lower fatty ester (i.e. acetic, propionic, butyric, etc.) or an aromatic ester (i.e. benzoic, naphthoic, etc.) or a substituted derivative thereof.

These compounds are converted by the practice of this invention to the corresponding 16-keto derivatives. If a second unprotected hydroxy group is present, it too is oxidized to a keto group, provided that it is the sole substituent on the hydroxylated-carbon atom.

A particularly preferred class of starting compounds is that having the following general formula:

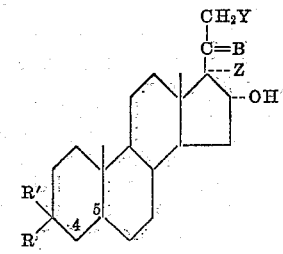

wherein the 4,5 position is double-bonded or saturated (the 4,5-double-bonded steroids are preferred), and wherein R is hydrogen, R' is hydroxy, or together R and R' is oxo (keto) or a group convertible thereto by hydrolysis (e.g. ketal), R and R' as oxo being preferred; Z is hydrogen or α-hydroxy; B is a keto radical or a protected keto radical such as a ketal radical; and Y is hydrogen, halogen, hydroxy, or R''O, wherein R'' is an organic radical such as an acyl radical, particularly a carbonyl radical (such as acetyl, propionyl, butyryl, benzoyl, napthoyl, etc.) or an organic radical connected to the oxygen through a carbon to oxygen bond, such as a hydrocarbon radical (e.g. methyl, ethyl, cyclohexyl, or benzyl).

The resulting compounds are the 16-keto derivatives having the general formula:

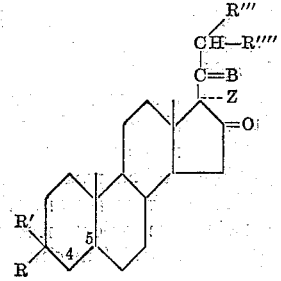

wherein the 4,5 position is double-bonded or saturated (preferably double-bonded); R, R', Z, and B are as above-defined; and R''' is hydrogen and R'''' is Y or together R''' and R'''' is keto.

The 16-keto derivatives of this invention are prepared by reacting the corresponding 16-hydroxy steroids with an oxidizing agent under suitable conditions. The oxidizing agent used is a compound containing a hexavalent chromium ion and includes a salt of chromic acid, chromic anyhdride (chromic trioxide), or a chromate ester. Of these, chromic anhydride is preferred.

The reaction is carried out in the absence of excess acid [by excess acid is meant acid other than that required to bind the resulting reduced chromic (chromous) ion as a salt] and in an organic solvent which is unreactive towards the chromic group. Suitable solvents include ketones, such as acetone, methyl ethyl ketone, etc.; ethers, such as diethyl ether, dipropyl ether; cyclic ethers, such as dioxane and tetrahydrofuran; etc.

In order to bind the reduced chromic ion as a salt, it is preferred that the oxidation reaction be carried out in the presence of a mineral acid present in stoichiometric amounts with the chromic oxidizing agent. Among the acids which may be used are hydrochloric acid, sulfuric acid, nitric acid, etc., sulfuric acid being preferred. Any substantial excess of acid beyond that necessary to bind the resulting chromous ion should be avoided, however, since such excess may cause undesired additional oxidations to occur.

The reaction is preferably conducted at a controlled temperature of less than 25° C. and more particularly at a temperature less than 15° C. under substantially anhydrous conditions. The reaction should be carried out under non-acid conditions, since the use of excess acid as either a solvent (i.e. acetic acid solvent) or as an oxidizing agent (i.e. excess sulfuric acid) will tend to oxidize the steroid beyond the desired 16-keto derivatives and cause cleavage of the D-ring or oxidation of the 17-side chain. The 16-keto steroid may be recovered from the reaction mixture in a number of ways, as, for example, by extraction with ether.

If the starting material has been esterified or etherified to prevent the oxidation of hydroxy groups other than the 16-hydroxy radical, the resulting 16-keto derivatives may be saponified (hydrolyzed), as by alkali metal alcoholates (i.e. sodium methylate), to convert the protected hydroxy group to its free hydroxy form.

The following examples are illustrative of the invention.

EXAMPLE 1

*16-ketoprogesterone*

350 mg. of 16α-hydroxyprogesterone are dissolved in 150 ml. acetone and the solution is cooled to 7° C. To this solution is added with stirring over a period of 15 minutes a solution of 150 mg. of $CrO_3$ and 240 mg. of concentrated $H_2SO_4$ in 75 ml. of water. The reaction mixture is then filtered, diluted with 20 ml. water and the acetone removed in vacuo. The resulting aqueous suspension is extracted with ether, the ether solution washed twice with 10 ml. of saturated $NaHCO_3$ solution and twice with 1 N NaOH. From the above ether solution about 165 mg. of starting material is recovered by evaporation of the solvent and crystallization from acetone. The combined NaOH extracts are acidified with cold hydrochloric acid and 16-ketoprogesterone is extracted into ether. The resulting ether extract is washed with $NaHCO_3$ solution and water, dried over sodium sulfate and evaporated to dryness in vacuo. About 126 mg. of crude, crystalline 16-ketoprogesterone is obtained which after crystallization from acetone-ether (about 98 mg.) has the following properties: needles M.P. 162–165° C.; $[\alpha]_D^{23}$ +37° (c.=0.77 in chloroform), +27° (c.=0.30 in methanol), +115° (c.=0.30 in .0185 N KOH—MeOH);

$\lambda_{max}^{EtOH}$ 239 mμ (ε=21,500), 286 mμ (ε=6000) (c.=0.0045%); $\lambda_{max}^{2.5\%}$ KOH in MeOH 241 mμ (ε=18,500), 308 mμ (ε=27,000); $\lambda_{max}^{CHCl_3}$ 5.74, 5.90, 6.02, 6.22μ

*Analysis.*—Calcd. for $C_{21}H_{28}O_3$ (328.44): C, 76.79; H, 8.59. Found: C, 76.76; H, 8.62.

The alcoholic solution of 16-ketoprogesterone gives an intense purple color with ferric chloride, indicative of its partially enolic nature.

The steroid has the following formula:

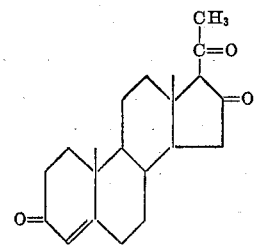

EXAMPLE 2

*16-keto-11-desoxycorticosterone 21-benzoate ($\Delta^4$-pregnene-21-ol-3,16,20-trione 21-benzoate)*

160 mg. of 16α-hydroxy-11-desoxycorticosterone 21-benzoate is dissolved in 25 ml. of acetone and the solution cooled to 8° C. To this solution is added with stirring 0.14 ml. of a solution (200 mg. $CrO_3$, 320 mg. $H_2SO_4$ concentrated, made up to 1 ml.) containing 28 mg. $CrO_3$ (1.2 equivalents). After five minutes ethanol is added and the precipitate of $Cr_2(SO_4)_3$ filtered off. The acetone is then evaporated in vacuo, the resulting residue dissolved in a mixture of ether and chloroform and extracted with ice-cold $NaHCO_3$ followed by ice-cold 1 N NaOH. The NaOH-solution is immediately neutralized with ice-cold HCl and extracted with ether. The dried ether solution upon evaporation yields about 56 mg. of crude crystalline 16-keto-11-desoxycorticosterone 21-benzoate, which after recrystallization from acetone has the following properties: M.P. 198–199.5° C.; $[\alpha]_D$ —6° (c.=0.34 in chloroform);

$\lambda_{max}^{EtOH}$ 233 mμ (ε=29,500), 273 mμ (ε=2900), 281 mμ (ε=2700); $\lambda_{max}^{Alkali}$ 234 mμ (ε=25,600), 306 mμ (ε=19,300); $\lambda_{max}^{Nujol}$ 5.80μ, 5.86μ, 5.98μ, 6.21μ, 6.27μ, 6.32μ, 13.72μ

*Analysis.*—Calcd. for $C_{28}H_{32}O_5$ (448.54): C, 74.97; H, 7.19. Found: C, 74.84; H, 7.06.

$\Delta^4$-pregnene-21-ol-3,16,20-trione 21-benzoate gives an intense coloration with ferric chloride.

The steroid has the following formula:

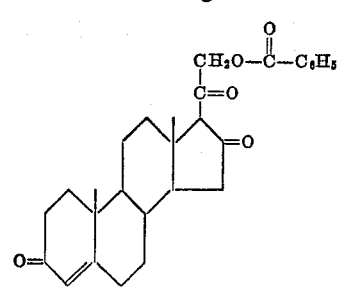

EXAMPLE 3

*16-keto-11-desoxycorticosterone acetate ($\Delta^4$-pregnene-21-ol-3,16,20-trione acetate)*

80 mg. of a mixture containing the mono- and diacetates of $\Delta^4$-pregnene-16α,21-diol-3,20-dione is dissolved in 20 ml. acetone, cooled to 8° C. and oxidized with a mixture containing 30 mg. of $CrO_3$ (0.15 ml. of a solution of 200 mg. $CrO_3$, 320 mg. of concentrated $H_2SO_4$ made up to 1 ml. with water). After 10 minutes, the $Cr_2(SO_4)_3$ which has precipitated is filtered off, the acetone evaporated in vacuo, the residue dissolved in ether, washed with ice-cold $NaHCO_3$ solution and then with ice-cold 1 N NaOH. The NaOH extract is acidified with cold HCl, extracted with ether and the ether solution evaporated to dryness in vacuo. About 40 mg. of an oil is obtained, which even after chromatography on silica cannot be crystallized. The amorphous 16-keto-11-desoxycorticosterone acetate has $[\alpha]_D^{23}$ —12° C. (c.=0.215 in chloroform) and gives an intense coloration with ferric chloride.

EXAMPLE 4

16-keto-11-desoxycorticosterone ($\Delta^4$-pregnene-21-ol-3,16,20-trione 21.5 mg. of the chromatographed acetate of Example 3 (representing a pool including the chloroform up to chloroform-acetone (1:1) eluates) is dissolved in 2 ml. methanol and 0.5 ml. of a methanolic solution of sodium methylate (containing 6 mg. Na) is added. The mixture is allowed to stand at room temperature under $N_2$ for 30 minutes. A few drops of glacial acetic acid and 5 ml. water are added, the methanol removed in vacuo and the aqueous suspension extracted with chloroform. About 18 mg. of oily 16-keto-11-desoxycorticosterone $[\alpha]_D$ +7° (c.=0.19 in chloroform) are obtained;

$\lambda_{max}^{CHCl_3}$ 2.90µ, 5.74µ, 5.86µ, 6.02µ, 6.20µ

The steroid has the following formula:

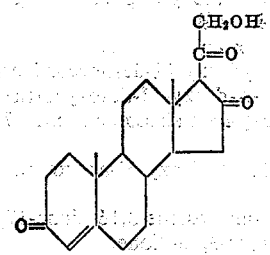

By proceeding in the same manner as in the foregoing examples, other 16α-hydroxy steroids may be converted to their 16-keto derivatives. Thus, when 16α,17-dihydroxy-11-desoxycorticosterone acetate [16α-hydroxy-Reichstein's Compound S-acetate] is reacted with chromic trioxide under the conditions of Example 1, 16-keto-17-hydroxy-11-desoxycorticosterone acetate is formed, which may be saponified according to the method of Example 4 to the free hydroxy derivative. If 16α-hydroxy-pregnenolone 3-acetate is substituted for 16α-hydroxy-progesterone in Example 1, 16-keto-pregnenolone 3-acetate is produced which may be saponified to 16-ketopregnenolone.

16α-hydroxy-11-desoxycorticosterone is also useful as a starting material in the preparation of $\Delta^4$-androstene-3,16-dione, a new steroid which is a protein anabolic agent. The process of this conversion is more fully disclosed by the following schematic analysis and examples:

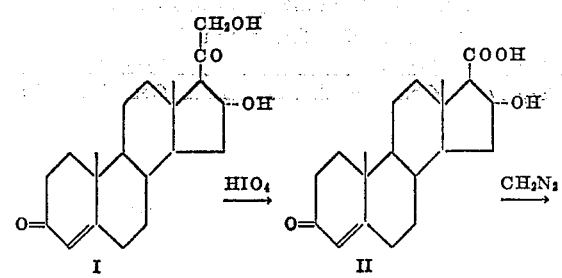

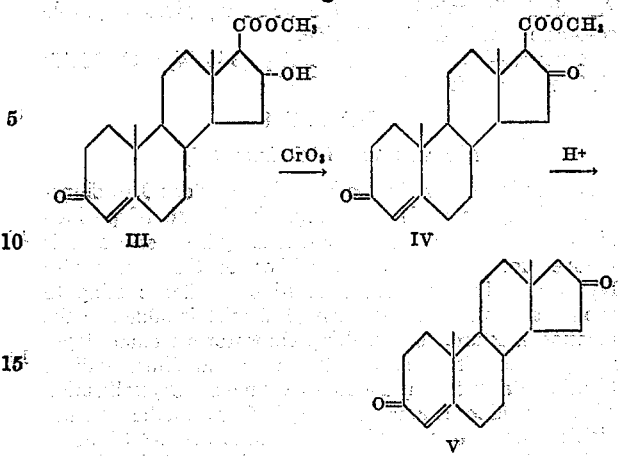

EXAMPLE 5

16α-hydroxy-$\Delta^4$-androstene-3-one-17β-carboxylic acid (II)

To a solution of 100 mg. of 16α-hydroxy-11-desoxycorticosterone (I) in 10 ml. of pure dioxane is added a solution of 132 mg. of periodic acid dihydrate in 10 ml. of water. The mixture is allowed to remain at room temperature for 3 hours and after adding 5 ml. of water is placed in the refrigerator for an additional 12 hours. A crystalline product separates out (about 86 mg.), which could not be recrystallized from the common organic solvent because of its extreme insolubility; M.P. 315–317° C. (dec.).

$\lambda_{max}^{Nujol}$ 3.05µ (OH); 5.76µ and 5.82µ (COOH), 6.04µ and 6.09µ ($\Delta^4$-3-ketone)

Analysis.—Calcd. for $C_{20}H_{28}O_4$ (332.42): C, 72.26; H, 8.49. Found: C, 71.51; H, 7.97.

EXAMPLE 6

Methyl 16α-hydroxy-$\Delta^4$-androstene-3-one-17β-carboxylate (III)

To a suspension of $\Delta^4$-androstene-16α-ol-3-one-17β-carboxylic acid (II) (60 mg.) in methanol is added excess diazomethane in ether. The acid dissolves slowly with evolution of nitrogen and after 15 hours the resulting solution is evaporated to dryness in vacuo. The residual methyl ester crystallizes readily from acetone-hexane and melts at 204–206° C.; $[\alpha]_D^{23}$ +115° (c., 0.32 in chloroform);

$\lambda_{max}^{alc.}$ 239 mµ ($\epsilon$=19,500); $\lambda_{max}^{Nujol}$ 2.96µ (OH), 5.78µ and 5.82µ (ester carbonyl); 6.05µ and 6.22µ ($\Delta^4$-3-ketone)

Analysis.—Calcd. for $C_{21}H_{30}O_4$ (346.45): C, 72.80; H, 8.73. Found: C, 73.08; H, 8.49.

EXAMPLE 7

Methyl $\Delta^4$-androstene-3,16-dione-17β-carboxylate (IV)

To a solution of methyl $\Delta^4$-androstene-16α-ol-3-one-17β-carboxylate (III) (35 mg.) in 1 ml. of glacial acetic acid is added dropwise a solution of 10 mg. of chromic acid in 0.2 ml. of acetic acid. After 15 minutes at room temperature the excess chromic acid is destroyed with ethanol and the mixture is concentrated to small volume. The residue is distributed between chloroform and water, the chloroform solution extracted with dilute bicarbonate and water and the solvent removed in vacuo. The crystalline residue on recrystallization from acetone-hexane yields about 10 mg. of the pure ketoester of melting point 139–142° C. and $[\alpha]_D^{23}$ —27° (c., 0.30 in chloroform);

$\lambda_{max}^{alc.}$ 239µ ($\epsilon$=17,500), 290 mµ ($\epsilon$=94); $\lambda_{max}^{2\%KOH\ in\ MeOH}$ 241 mµ ($\epsilon$=20,000), 285 mµ ($\epsilon$=16,500); $\lambda_{max}^{Nujol}$ 5.78µ and 5.82µ (ester carbonyl), 5.98µ and 6.17µ ($\Delta^4$-3-ketone)

An alcoholic solution of the ketoester gives a purple coloration with ferric chloride.

Analysis.—Calcd. for $C_{21}H_{28}O_4$ (344.44): C, 73.22; H, 8.19. Found: C, 73.03; H, 8.05.

EXAMPLE 8

$\Delta^4$-androstene-3,16-dione (V)

A solution of crude methyl $\Delta^4$-androstene-3,16-dione-17$\beta$-carboxylate (IV) (234 mg.) in 10 ml. of purified dioxane and 10 ml. of 2 N aqueous hydrochloric acid is refluxed for six hours and the liberated $CO_2$ swept with $N_2$ into barium hydroxide solution. After cooling to room temperature chloroform (100 ml.) is added to the reaction mixture, the resulting chloroform-dioxane layer is separated off, washed with water and dilute sodium bicarbonate and evaporated to dryness. Crystallization of the residue (about 146 mg.) from methanol-ether yields about 70 mg. of pure $\Delta^4$-androstene-3,16-dione, M.P. 150–152° C.; $[\alpha]_D^{23}$ —96° (c., 0.85 in chloroform);

$\lambda_{max.}^{alc.}$ 240 m$\mu$ ($\epsilon$=17,300); $\lambda_{max.}^{Nujol}$ 5.78$\mu$ (16-ketone) 5.94$\mu$ and 6.18$\mu$ ($\Delta^4$-3-ketone)

Analysis.—Calcd. for $C_{19}H_{26}O_2$ (286.40): C, 79.68; H, 9.15. Found: C, 79.71; H, 8.91.

The invention may be otherwise embodied within the scope of the appended claims.

We claim:

1. A process of oxidizing a 16-hydroxy steroid which comprises reacting a 16-hydroxy steroid of the general formula

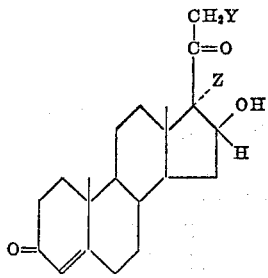

wherein Z is selected from the group consisting of hydrogen and $\alpha$-hydroxy; and Y is selected from the group consisting of hydrogen, halogen, hydroxy, lower alkanoyloxy and benzoxy, with a chromic oxidizing agent in the absence of acid other than that required to bind the resulting reduced chromic ion as a salt under non-acidic conditions and recovering the product thus produced.

2. A process for oxidizing a 16-hydroxy steroid which comprises reacting a 16-hydroxy steroid of the general formula

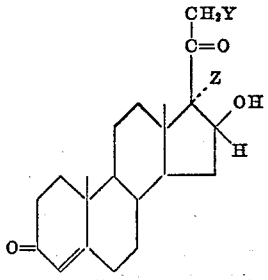

wherein Z is selected from the group consisting of hydrogen and $\alpha$-hydroxy; and Y is selected from the group consisting of hydrogen, halogen, hydroxy, lower alkanoyloxy and benzoxy, in an organic solvent in the absence of acid other than that required to bind the resulting reduced chromic ion as a salt with a chromic oxidizing agent, and recovering the product thus produced.

3. A process for oxidizing a 16-hydroxy steroid which comprises reacting a 16-hydroxy steroid of the general formula

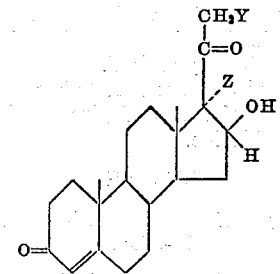

wherein Z is selected from the group consisting of hydrogen and $\alpha$-hydroxy; and Y is selected from the group consisting of hydrogen, halogen, hydroxy, lower alkanoyloxy and benzoxy, in a non-acidic solvent with an oxidizing agent comprising a stoichiometric amount of a chromic oxidizing agent and a mineral acid, and recovering the product thus produced.

4. The process of claim 3 wherein the steroid is 16$\alpha$-hydroxyprogesterone.

5. The process of claim 3 wherein the steroid is an ester of 16$\alpha$-hydroxy-desoxycorticosterone and an acid selected from the group consisting of lower fatty acids and benzoic acid.

6. 16-ketoprogesterone.

7. An ester of 16-keto-11-desoxycorticosterone and an acid selected from the group consisting of lower fatty acids and benzoic acid.

8. 16-keto-11-desoxycorticosterone.

9. 16-keto-17-hydroxy-11-desoxycorticosterone acetate.

10. 16-keto-17-hydroxy-11-desoxycorticosterone.

11. 16$\alpha$-hydroxy-$\Delta^4$-androstene-3-one-17$\beta$ - carboxylic acid.

12. Methyl 16$\alpha$-hydroxy-$\Delta^4$-androstene-3-one-17$\beta$-carboxylate.

13. Methyl $\Delta^4$-androstene-3,16-dione-17$\beta$-carboxylate.

14. $\Delta^4$-androstene-3,16-dione.

15. A steroid of the general formula

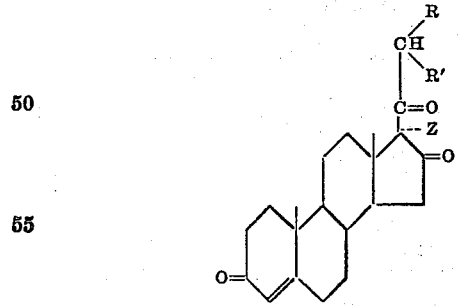

wherein Z is selected from the group consisting of hydrogen and $\alpha$-hydroxy; individually R is hydrogen, R' is selected from the group consisting of hydrogen, halogen, hydroxy, lower alkanoyloxy, and benzoxy, and together R and R' is keto.

References Cited in the file of this patent

UNITED STATES PATENTS

| | | |
|---|---|---|
| 2,304,837 | Marker | Dec. 15, 1942 |
| 2,727,907 | Chinn et al. | Dec. 20, 1955 |